Patented Mar. 1, 1932

1,847,600

UNITED STATES PATENT OFFICE

ROBERT A. DUNHAM, OF LONG BEACH, CALIFORNIA, ASSIGNOR TO UNION OIL COMPANY OF CALIFORNIA, OF LOS ANGELES, CALIFORNIA, A CORPORATION OF CALIFORNIA

PLASTICIZING RUBBER

No Drawing.    Application filed March 14, 1931. Serial No. 522,787.

The invention relates to the reclamation of vulcanized rubber and the reclaimed product. It also relates to the plasticizing of rubber in connection with milling operations, and is applicable to both reclaimed rubbers and raw rubbers. This application is a continuation in part of my earlier applications Serial Nos. 313,180 and 313,182 filed October 17, 1928.

The object of the present invention is to obtain a plasticized rubber mass in the form of a plasticized coagulated raw rubber or a plasticized reclaimed rubber or a plasticized mixture of raw and reclaimed rubber, and also to obtain a reclaimed rubber which is far superior to reclaimed rubber products obtained by methods known heretofore, and to present a reclaimed product having characteristics closely approximating those of the original rubber or rubber mixture used in the original goods before vulcanization.

It has been the common practice in the reclamation of rubber to shred or grind the entire body from which rubber is to be recovered, to treat the mass for the separation of fiber and then to recover the rubber from the mass. But the recovered rubber as obtained by these processes has been of poor quality and has never even closely approximated the original rubber mass as used in the goods before vulcanization.

I discovered that vulcanized rubber can be devulcanized and dissolved by a solvent known as Edeleanu extract obtained in the treatment of petroleum distillates. This extract is a by-product obtained in the refining of petroleum distillates by extraction with liquid sulfur dioxide, this treatment being commonly known as the Edeleanu process. When a petroleum distillate is extracted with said liquid sulfur dioxide complex nitrogen and sulfur bodies, aromatic hydrocarbons and unsaturated hydrocarbons are removed from the oil by the liquid sulfur dioxide, and upon evaporation of the liquid sulfur dioxide these bodies remain behind in the form of a liquid known as Edeleanu extract. It is this extract which I have found to be a solvent and a devulcanizing agent for vulcanized rubber. I found further that Edeleanu extract may be used as a softening agent for the rubber particles of rubber latex, merely by the addition to the latex of a small amount of Edeleanu extract sufficient only to soften the walls of the particles and insufficient to cause complete solution which will result if larger quantities are used. A coagulum from latex so treated possesses improved properties over rubbers heretofore produced from latex. Also the various other treating agents hereinafter described produce like effects.

I have also found such Edeleanu extract to be a plasticizing agent for vulcanized rubbers, reclaimed rubbers of various types, raw rubbers and mixtures of these rubbers. The plasticizing effects are accomplished by working the rubber masses with Edeleanu extract in a rubber mill or in any other mechanical working device, thereby thoroughly incorporating the Edeleanu extract into the rubber.

The invention here presented comprises the plasticizing of rubbers by the incorporation of Edeleanu extract or similar petroleum fractions soluble in liquid sulfur dioxide, into coagulated rubber masses such as vulcanized rubbers, reclaimed or devulcanized rubbers, raw rubbers, and various mixtures thereof, for the purpose of facilitating the milling and handling of such rubbers.

Upon treatment of vulcanized rubber with said extract at a suitable temperature devulcanization takes place, i. e. the rubber loses its coherence so that it can be reduced by slight mechanical working to a liquid condition such that the solution is capable of being filtered or centrifuged. When the solution is filtered it carries with it through the filtering medium finely divided or colloidal fillers such as carbon black and zinc oxide so that when the rubber is removed these fillers come out with it thus yielding an unvulcanized rubber containing fillers and suitable for reuse. Except for coarse fillers removed by the filtering step, the resulting rubber mass is of substantially the same consistency as the rubber mixture originally employed in the goods now being reclaimed. If the rubber employed in these goods was a good grade of raw rubber having high tensile strength and marked cohesiveness, the reclaimed products will be of similar quality. Of course, if the original rubber mixture was itself a reclaimed rubber of bad quality with an excess amount of filler or coloring matter the product reclaimed by the present process will approach only the character of the poor rubber mass originally used.

Considering the process in greater detail I obtain an Edeleanu extract from the treatment of petroleum distillates as above defined, and introduce into it old vulcanized rubber or vulcanized rubber goods and digest the same in said extract at about 340° F. preferably under a reflux condenser and under pressure if required until the rubber material has lost its coherence. The rubber goods so introduced into the extract may be whole, but preferably will be cut into piece or chunks of convenient size. Shredding or grinding is avoided, and fabric, cords and other materials found in the old goods are thereby left in pieces of appreciable size to facilitate their subsequent removal from the solution. Digestion may be carried on either at atmospheric pressure or at higher pressures as advantageous or desirable. When the rubber mass has lost its coherence, the mixture is then worked or agitated so as to cause liquefaction of the rubber and liberation of the same from coarse foreign matter such as metal, fabric, cords and cellulose fibers, care being taken to avoid comminution of the latter. The material thus thoroughly digested to bring the rubber into solution, may be passed through a filter or a centrifuge to remove all said coarse foreign matter, the rubber solution easily passing the filter or centrifuge and carrying with it the finely divided filler or compounding materials which are thereby found in the filtrate. According to a preferred method of operation, the mass will be first centrifugally extracted through a filter medium such as a screen basket, washed on the screen with Edeleanu extract, and then subjected to pressure filtering through a cloth or the like to remove all fibers. The filtrate obtained by any of those methods may be freely diluted with any of the common solvents for raw rubber.

The rubber may be extracted from the solvent by means of any precipitating or selective extraction agent which is miscible with the solvent but is itself a non-solvent for the rubber. A good example of such an agent is acetone which throws down the rubber mass readily. Alcohols, especially anhydrous alcohols, also may be used for this purpose. It is also feasible to remove the solvent from the rubber by distilling or evaporating, excess temperatures being avoided if necessary, by use of vacuum or steam, or both. Also currents of air or gas may be employed. The rubber so recovered, if reclaimed from goods in which a good grade of rubber was originally used, will be a pasty mass closely resembling compounded milled rubber and having a high order of cohesiveness and tensile strength.

This reclaimed rubber is now soluble in any of the common solvents for raw rubber and from it goods may be manufactured by any desired method.

From the foregoing it will be clear that the treatment of rubber with Edeleanu extract results in devulcanization and solution of said rubber. Devulcanization takes place at a temperature somewhat above 325° F., e. g., 340° F., the rubber being readily disintegrated and dispersed in the solvent without appreciable disintegration of the coarse foreign bodies. New goods made up from the rubber so reclaimed are then easily revulcanized at temperatures commonly used for vulcanization of virgin rubber, except that if a material amount of the Edeleanu extract remains in the rubber mass, the vulcanization temperature must be controlled so as not to exceed 325° F., otherwise a cure will not result because of the devulcanization tendency of the extract above such temperature.

As a specific example of one method of carrying on the reclaiming step, an Edeleanu extract obtained from the refining of kerosene distillate from a California stock by extraction with liquid sulfur dioxide according to well known Edeleanu process, was employed. An old inner tube for automobile tires was cut into pieces and digested in the extract for a period of six hours at 350° F., thereby devulcanizing and dissolving all the rubber. The resulting mass was then filtered and the zinc oxide filler passed through with the rubber solution. In a second instance, an old tire casing was cut into chunks and digested in Edeleanu extract for a period of twelve hours at 350° F. with the result that the rubber was devulcanized and softened to such an extent that when the mass was put through a picker the cords and cellulose readily separated, and the rubber readily dispersed in the solvent extract. The mixture of cellulose fragments and rubber solution was then passed to a basket centrifuge in which the major portion of the cellulose was separated. The solution was then pumped through a pressure filter thereby separating the remainder of the cellulose and yielding a solution of rubber containing the finely divided filler.

The filtrate so obtained by any of the above methods, which filtrate comprises a solution of reclaimed rubber dissolved in Edeleanu extract, instead of being treated to precipitate the rubber, may be used directly as a rubber cement, or as an addition to a new rubber cement for such purposes as the manufacture of rubber dip goods, or for other purposes.

In a more important aspect said filtrate of Edeleanu extract and dissolved rubber may be employed as a plasticizing agent to be added and incorporated into new rubber being milled, that is into raw rubber being worked on the rolls of a rubber mill. Obviously this solution may be used also in the compounding of mixtures of reclaimed and raw rubbers by incorporating said solution therewith to accomplish the desired plasticizing effect on the mill. Similarly, it may be used in working vulcanized rubber on rubber mills or in other rubber working machines to effect plasticization.

Further, I have found that the Edeleanu extract is the efficient agent in the plasticizing operation, and that the reclaimed or devulcanized rubber in solution therein, regardless of the value of its additional plasticizing action, may nevertheless also cause a reduction in the tensile strength of the resultant rubber article and adversely affect other physical properties thereof, such as rendering the plasticized mass too tacky during working and lowering the wearing resistance of the final product. Of course if it be desired to use such solution of reclaimed rubber for purposes of economy and if a rubber of high quality and high tensile strength be not essential, then the Edeleanu extract solution of reclaimed rubber may be used. But, in producing a high quality rubber of high tensile strength, I have found it desirable to use Edeleanu extract alone, that is without a solution of reclaimed rubber therein, the extract being employed to plasticize raw rubber alone or any of those rubber mixtures compounded as above indicated, e. g. raw rubber plus reclaimed rubber and/or the usual compounding materials. In any of these cases the thorough incorporation of small quantities of Edeleanu extract into the rubber masses being milled or otherwise mechanically worked quickly accomplishes the desired plasticizing effects. Commercially desirable amounts of Edeleanu extract to be incorporated into the rubber normally will run from 3 to 5%, but workable limits under varying conditions will extend roughly between 1 and 10%. The upper limit however is held within what is sufficient only to produce good plasticizing effects without tending toward solution or undue tackiness. It is preferable in using the extract to add first only a very small percentage, say ½%, and then as milling proceeds to add additional quantities gradually until the desired amount has been introduced and thoroughly incorporated. Instead of using milling rolls, other mechanical rubber-working devices may be employed such as a blade-type of mixer or the like which is capable of working the rubber into a softened or plastic condition where it will sheet readily and lend itself to formation into desired goods. The plasticizing operation, as well understood in the art, is the working of the rubber in the presence of the selected plasticizing agent until the desired softened or plastic condition is obtained. When the plasticizing is accomplished on the rolls of a rubber mill, the action first is to knead the rubber into a shapeless mass, whereupon, especially as the Edeleanu extract or other plasticizer is added, the rubber begins to soften up under the additional influence of the generated heat and of external heat if applied to the rolls. Gradually this working so plasticizes the rubber mass that a uniform sheet will be formed as the rubber is worked and forced between the rolls, this sheet being taken off when in the desired condition. Pigments and fillers may be added according to know practices.

Exactly the same procedure may be followed where a quantity of so-called "mineral rubber" is to be added, that is a natural asphalt such as gilsonite and elaterite or a petroleum asphalt obtained from residues of asphaltic petroleums. Instead of Edeleanu extract other petroleum fractions, especially where soluble in liquid sulfur dioxide, may be employed. Desirable Edeleanu extracts and other petroleum fractions soluble in sulfur dioxide are particularly those obtained from kerosene distillates such as kerosene distillates from California petroleum stock. But $SO_2$-soluble fractions both from lighter distillates such as gasoline and from heavier distillates such as light and heavy lubricating oils may be used. In general the extracts and fractions from the lighter petroleum distillates such as gasoline and kerosene are somewhat more efficient than those from the heavier distillates. Those from kerosene appear to be most desirable for all practical purposes, but those obtained from the other distillates nevertheless possess real merit. The sludge oils elsewhere herein disclosed are included in this classification.

Other suitable fractions above mentioned are fractions of other oils such as shale oils, tar oil, and coal tars and oils, when such fractions correspond generally in character to the Edeleanu extract, that is when they contain unsaturated and aromatic hydrocarbons and nitrogens and sulfur bodies and are soluble in liquid sulfur dioxide. Such fractions are applicable not only for the reclamation of rubber by solution but also for the plasticizing of various rubbers as above disclosed.

As an example of said other fractions, acid sludge oil from petroleum treatment, may be taken. Acid sludge oil is recovered from acid sludge which is obtained from the treatment of various petroleum fractions (e. g. kerosene) with sulfuric acid. By hydrolyzing the sludge as with steam the sludge separates into two layers, one of which is a solution of sulfuric acid and the other of which is known as "sludge oil" and is the acid sludge oil here designated. The treatment of the rubber goods with these agents is essentially the same as with Edeleanu extract as above described, and the rubber solution and reclaimed rubber obtained have the same general characteristics. The invention, therefore, resides also in the treatment of raw rubber masses or waste or vulcanized rubber goods with agents obtained in general as fractions largely soluble in liquid $SO_2$ and especially such fractions containing relatively large proportions of unsaturated and aromatic hydrocarbon and nitrogen and sulfur bodies, the invention particularly residing in plasticizing with such agents the various rubber and rubber compounds herein mentioned.

Vulcanization of rubbers compounded and plasticized by any of the above methods will be accomplished and will be controlled as previously indicated in connection with the revulcanization of rubber reclaimed by solution in Edeleanu extract, that is, vulcanization will proceed in any conventional manner of vulcanizing except that, due to the ability of Edeleanu extract to devulcanize above 325° F., the vulcanization temperature must be held low enough to prevent Edeleanu extract present from exerting important devulcanizing tendencies.

It is to be understood that wherever the term "Edeleanu extract" is used, it is intended to cover any fraction distilled from said extract and having the required properties. For example, in some instances it may be desirable to use an agent either more or less volatile than the original Edeleanu extract, and such agent may be readily obtained by distillation of the extract. Thus a fraction of Edeleanu extract distilled over between 400° F. and 550° F. where the extract is obtained from a California stock is very desirable.

Similarly wherever the term "sludge oil" is employed, it is intended that the expression shall include any sludge oil fraction having the necessary characteristics as above indicated. This is particularly true where the sludge oil itself is too heavy to be suitable for the required purpose. In such case a lighter desirable fraction can be obtained by distillation.

It is to be noted that the above described $SO_2$-soluble fractions exert anti-oxidizing effects upon the vulcanized rubbers finally produced according to the present disclosures and result in prolongation of the life of the rubbers. This use as an anti-oxidant is quite valuable in the case of Edeleanu extract where employed as a plasticizing agent in the milling of raw rubber, the effect also being obtained in vulcanized goods obtained from reclaimed or devulcanized rubbers so milled and from mixtures of reclaimed and raw rubbers.

As an example of these benefits the results of tensile-strength tests, where the rubbers were subjected to accelerated aging, are given in the following table:

| Test | Plasticizer used | Tensile strength, lbs./sq. in. | | | | Final loss |
|---|---|---|---|---|---|---|
| | | Original rubber | Rubber after aging | | | |
| | | | Three days | Five days | Ten days | |
| 1 | None | 3800 | 3400 | 3200 | 2600 | 31.6% |
| 2 | Pine tar | 3600 | 2900 | 2400 | 500 | 86% |
| 3 | Edeleanu extract from California kerosene | 3500 | 3350 | 3200 | 3200 | 8.6% |

From the above it is clear that the rubber is in fact preserved to a considerable extent by the Edeleanu extract even over rubbers in which no plasticizer has been used, and that the loss in tensile strength is only about one-tenth that where pine-tar is used as a plasticizer according to a common practice.

Thus any of the agents herein disclosed may be employed as plasticizers for working vulcanized, reclaimed and raw rubbers, and mixtures thereof, and to impart to such rubbers the effects of the agents as anti-oxidants to retard deterioration in the vulcanized products.

I claim:

1. A method of plasticizing rubber which comprises incorporating Edeleanu extract into raw rubber.

2. A method for plasticizing rubber which comprises incorporating Edeleanu extract into a coagulated rubber mass.

3. A method for plasticizing rubber comprising incorporating into a coagulated rubber a petroleum fraction largely soluble in liquid sulfur dioxide.

4. A method for plasticizing rubber which comprises incorporating into a coagulated rubber mass an agent largely soluble in liquid sulfur dioxide and containing nitrogen and sulfur compounds and unsaturated and aromatic compounds.

5. A method for plasticizing rubber comprising incorporating sludge oil into a coagulated rubber mass.

6. A method for plasticizing rubber comprising incorporating into a coagulated rubber mass a petroleum fraction largely soluble in liquid sulfur dioxide and limiting the amount of such fraction to a quantity sufficient only to soften and plasticize said rubber mass.

7. A method of plasticizing rubber comprising milling a coagulated raw rubber with a petroleum fraction soluble in liquid sulfur dioxide in quantity sufficient to plasticize the rubber mass.

8. A method for plasticizing raw rubber comprising working into a coagulated raw rubber an Edeleanu extract from a kerosene distillate in quantity sufficient to plasticize the mass.

9. A method for plasticizing rubber comprising mechanically working a coagulated rubber mass to promote plasticization, gradually adding small amounts of Edeleanu extract to the rubber during working to facilitate the plasticizing action, and continuing the working and addition of Edeleanu extract until the desired plasticization has been produced.

10. A plasticized rubber mass containing coagulated raw rubber and a plasticizer in the form of a petroleum fraction largely soluble in liquid sulfur dioxide.

11. A plasticized coagulated rubber mass containing a plasticizer in the form of a kerosene fraction largely soluble in liquid sulfur dioxide.

12. A method of plasticizing rubber comprising mixing a raw rubber with a reclaimed rubber and incorporating into the mixture a petroleum fraction soluble in liquid sulfur dioxide in a quantity sufficient to plasticize the mass.

13. A method for preparing rubber comprising combining raw rubber and reclaimed rubber and introducing into the mixture an Edeleanu extract in quantity sufficient to plasticize the mass.

14. A method of plasticizing vulcanized rubber comprising mechanically working the vulcanized rubber with a quantity of Edeleanu extract sufficient to plasticize the rubber and continuing the working for a time sufficient to produce the plasticizing effect.

15. A raw rubber containing a plasticizer comprising a devulcanized rubber and a petroleum fraction largely soluble in liquid sulfur dioxide.

16. A plasticized coagulated raw rubber containing a reclaimed rubber and a petroleum fraction largely soluble in liquid sulfur dioxide.

17. A method of plasticizing rubber comprising milling coagulated raw rubber with reclaimed rubber and an Edeleanu extract in quantity sufficient to plasticize the rubber mass.

18. A method for preparing rubber goods comprising incorporating Edeleanu extract into a coagulated raw rubber mass in quantity sufficient to plasticize the rubber mass, forming an article therefrom, and vulcanizing the article below approximately 325° F.

19. A method for preparing rubber articles comprising incorporating into a coagulated rubber mass a petroleum fraction largely soluble in liquid sulfur dioxide in quantity sufficient to plasticize the rubber mass, forming an article therefrom and vulcanizing the articles at a temperature somewhat below approximately 325° F.

Signed at Wilmington, in the county of Los Angeles and State of California, this 25th day of February A. D. 1931.

ROBERT A. DUNHAM.